United States Patent
Agrawal et al.

(10) Patent No.: US 12,404,044 B2
(45) Date of Patent: Sep. 2, 2025

(54) REDUCING PACKAGE VIBRATION DURING TRANSPORTATION BY INITIATING MOBILE VEHICLES BASED ON COMPUTER ANALYSIS

(71) Applicant: International Business Machines Corporation, Armonk, NY (US)

(72) Inventors: Tushar Agrawal, West Fargo, ND (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 17/936,476

(22) Filed: Sep. 29, 2022

(65) Prior Publication Data
US 2024/0111301 A1   Apr. 4, 2024

(51) Int. Cl.
*B64U 10/13*     (2023.01)
*B64U 101/64*    (2023.01)
(Continued)

(52) U.S. Cl.
CPC .............. *B64U 10/13* (2023.01); *G05D 1/101* (2013.01); *G06Q 10/0832* (2013.01);
(Continued)

(58) Field of Classification Search
CPC .. G05D 1/101; B64C 39/024; G06Q 10/0832; B64U 2201/102; B64U 2101/60; B64D 2201/00
See application file for complete search history.

(56) References Cited

U.S. PATENT DOCUMENTS 5,806,572 A * 9/1998 Voller ................. B65D 81/052
                                                          141/10
10,246,186 B1   4/2019 Beckman
(Continued)

FOREIGN PATENT DOCUMENTS

CN    209290666 U  *  8/2019
JP    H0528744 U      4/1993
(Continued)

OTHER PUBLICATIONS

English Translation of CN-209290666-U (Year: 2025).*
(Continued)

*Primary Examiner* — Erin M Piateski
*Assistant Examiner* — Eisen Yim
(74) *Attorney, Agent, or Firm* — Michael A. Petrocelli

(57) ABSTRACT

Managing a package delivery system deploying an unmanned vehicle including an inflatable unit for reducing package vibration in a transportation vehicle. Package data is received at a computer, and the package data includes package descriptions. Spatial positioning of the packages in the transport space is tracked to determine, spatial positioning changes between the packages in the transport space based on the package data received at the computer and the transport. One or more unmanned vehicles are delivered to the transport space based on the spatial positioning changes in the transport space, and the unmanned vehicles including inflatable units. The inflatable units are deployed in the transport space by inflating the inflatable units at locations in the transport space based on the spatial positioning changes to discourage package movement in the transport space.

18 Claims, 6 Drawing Sheets

(51) Int. Cl.
  *G05D 1/00*   (2024.01)
  *G06Q 10/0832*   (2023.01)
(52) U.S. Cl.
  CPC ...... *B64D 2201/00* (2013.01); *B64U 2101/64* (2023.01); *B64U 2201/102* (2023.01)

(56) References Cited

U.S. PATENT DOCUMENTS

| | | | |
|---|---|---|---|
| 10,726,379 | B1 | 7/2020 | Donnelly |
| 2019/0114577 | A1* | 4/2019 | Kilburn .................. G06F 9/542 |
| 2019/0263521 | A1* | 8/2019 | O'Brien .................. B64D 1/12 |
| 2020/0047347 | A1* | 2/2020 | Zhang .................. B65G 65/30 |
| 2021/0319582 | A1* | 10/2021 | Sangeneni ............... G06T 7/62 |
| 2022/0411056 | A1* | 12/2022 | Pratt, Jr. ............... G05D 1/686 |
| 2023/0242249 | A1* | 8/2023 | Thomas, Sr. .......... B64U 30/20 |
| | | | 244/138 R |

FOREIGN PATENT DOCUMENTS

| | | |
|---|---|---|
| KR | 20080042845 A | 5/2008 |
| KR | 20180002091 U | 1/2018 |
| NL | 2019993 B1 | 6/2019 |
| WO | 2020197416 A1 | 10/2020 |

OTHER PUBLICATIONS

Anonymous, "Package Protection", an IP.com Prior Art Database Technical Disclosure, IP.com No. IPCOM000260198D, IP.com Electronic Publication Date: Oct. 31, 2019, 3 pages, <https://priorart.ip.com/IPCOM/000260198>.

* cited by examiner

REDUCING PACKAGE VIBRATION DURING TRANSPORTATION BY INITIATING MOBILE VEHICLES BASED ON COMPUTER ANALYSIS

BACKGROUND

The present disclosure relates to reducing package vibration during package transportation by initiating mobile vehicles by a computer system using computer analysis of transport and package data. In a more specific example, the computer analysis can include computer simulation.

In one example of a package delivery system, delivery vehicles can transport products from one location to another location, for example, a warehouse to an end user, customer, or intermediate user or location. During transportation by the delivery vehicles to locations along a route, packages can be delivered to customers. The packages can be properly stored and packed on the delivery vehicle. The storing and packing of the packages can help to protect the contents of the packages from vibration, shifting, and/or movement in the delivery vehicles to prevent damages to the contents, e.g., products. In one example, as the packages are removed from the delivery vehicle, for instance as they are being delivered, spaces between packages are created in the delivery vehicle. Increased spaces between packages can result in more vibration of the packages and thereby the contents therein, and can increase risk of a package moving, falling, packages falling onto other packages, or otherwise undesirable movement of the packages which can damage the products inside the package.

SUMMARY

The present disclosure recognizes the shortcomings and problems associated with current techniques for managing a delivery system which deploys devices for reducing package vibration during transportation.

The present invention uses a computer system of a package delivery system, which can include computer simulation, for reducing package vibration during transportation using mobile vehicles having inflatable units for deployment in a transport area of a transport vehicle.

In one embodiment according to the present invention, a method or system can include a computer system for computer modeling of a delivery system and deploy mobile vehicles for reducing package vibration during transportation using mobile devices having inflatable units.

In an aspect according to the present invention, a computer implemented method manages a package delivery system deploying an unmanned vehicle including an inflatable unit for reducing package vibration in a transportation vehicle. The method includes receiving package data, at a computer, the package data including package descriptions, and receiving transport data at the computer, and the transport data including a transport space description and a transportation route of a transport vehicle. The method includes tracking, using the computer, spatial positioning of the packages in the transport space to determine, using the computer, spatial positioning changes between the packages in the transport space based on the package data received at the computer and the transport. The method includes delivering one or more unmanned vehicles to the transport space based on the spatial positioning changes in the transport space, and the unmanned vehicles including inflatable units; and deploying the inflatable units in the transport space by the unmanned vehicles inflating the inflatable units, respectively, at locations in the transport space based on the spatial positioning changes to discourage package movement in the transport space.

In a related aspect, the method further includes predicting open spaces in the transport space based on the spatial positioning and the spatial positioning changes between the packages; and based on the predicting of open spaces in the transport space, delivering the one more unmanned vehicles and initiating the deploying of the inflatable units including the inflating of the inflatable units at the locations corresponding to the predicted open spaces.

In a related aspect the unmanned vehicles are drones.

In a related aspect, the unmanned vehicles are drones, and the method further includes positioning the inflatable units, using the drones, respectively, between the packages based on the tracking data and the spatial positioning changes, and the locations in the transport space corresponding to the predicted space.

In a related aspect, the inflatable units of the drones include inflatable balloons for deployment in the transport space.

In a related aspect, deployment of the inflatable units occurs during the transportation route of the transport vehicle.

In a related aspect, the deployment of the inflatable units occurs while the transportation vehicle is in route to delivery destinations during the transportation route.

In a related aspect, the data includes an amount of packages, dimensions of the packages, and dimensions of a transport space in a transport vehicle, and a transportation route.

In a related aspect, the method further includes deflating inflated units of the inflatable units in response to transport space adjustments as a result of receiving packages in the transport space.

In a related aspect, the method further includes generating, using the computer, a digital model.

In a related aspect, the method further includes generating a digital model, using the computer; receiving a set of updated package data, wherein the updated package data includes updated package description and updated transport data; receiving updated tracking of the spatial positioning of the packages and updated spatial positioning changes between the packages; updating the delivering of the one or more unmanned vehicles, based on the set of the updated package data, the updated tracking, and the updated spatial positioning changes; updating the deploying of the inflatable units in the transport space, based on the updated spatial positioning changes; and communicating the updated deployment of the inflatable units to the unmanned vehicles.

In a related aspect, the method further includes iteratively generating the digital model to produce updated models.

In another aspect, a system for managing a package delivery system deploys an unmanned vehicle including an inflatable unit for reducing package vibration in a transportation vehicle. The system includes: a computer system comprising; a computer processor, a computer-readable storage medium, and program instructions stored on the computer-readable storage medium being executable by the processor, to cause the computer system to perform the following functions to; receiving package data, at a computer, the package data including package descriptions, and receiving transport data at the computer, the transport data including a transport space description and a transportation route of a transport vehicle; tracking, using the computer, spatial positioning of the packages in the transport space to determine, using the computer, spatial positioning changes between the packages in the transport space based on the package data received at the computer and the transport; delivering one or more unmanned vehicles to the transport space based on the spatial positioning changes in the transport space, and the unmanned vehicles including inflatable units; and deploying the inflatable units in the transport space by the unmanned vehicles inflating the inflatable units, respectively, at locations in the transport space based on the spatial positioning changes to discourage package movement in the transport space.

In a related aspect, the system further includes predicting open spaces in the transport space based on the spatial positioning and the spatial positioning changes between the packages; and based on the predicting of open spaces in the transport space, delivering the one more unmanned vehicles and initiating the deploying of the inflatable units including the inflating of the inflatable units at the locations corresponding to the predicted open spaces.

In a related aspect, the unmanned vehicles are drones.

In a related aspect, the unmanned vehicles are drones, and the system further includes program instruction to cause the computer system to: position the inflatable units, using the drones, respectively, between the packages based on the tracking data and the spatial positioning changes, and the locations in the transport space corresponding to the predicted space.

In a related aspect, the inflatable units of the drones include inflatable balloons for deployment in the transport space.

In a related aspect, the deployment of the inflatable units occurs during the transportation route of the transport vehicle.

In a related aspect, the deployment of the inflatable units occurs while the transportation vehicle is in route to delivery destinations during the transportation route.

In another aspect, a computer program product manages a package delivery system deploying an unmanned vehicle including an inflatable unit for reducing package vibration in a transportation vehicle. The computer program product includes a computer readable storage medium having program instructions embodied therewith, the program instructions executable by a computer to cause the computer to perform functions, by the computer, comprising the functions to; receiving package data, at a computer, the package data including package descriptions, and receiving transport data at the computer, the transport data including a transport space description and a transportation route of a transport vehicle; tracking, using the computer, spatial positioning of the packages in the transport space to determine, using the computer, spatial positioning changes between the packages in the transport space based on the package data received at the computer and the transport; delivering one or more unmanned vehicles to the transport space based on the spatial positioning changes in the transport space, and the unmanned vehicles including inflatable units; and deploying the inflatable units in the transport space by the unmanned vehicles inflating the inflatable units, respectively, at locations in the transport space based on the spatial positioning changes to discourage package movement in the transport space.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
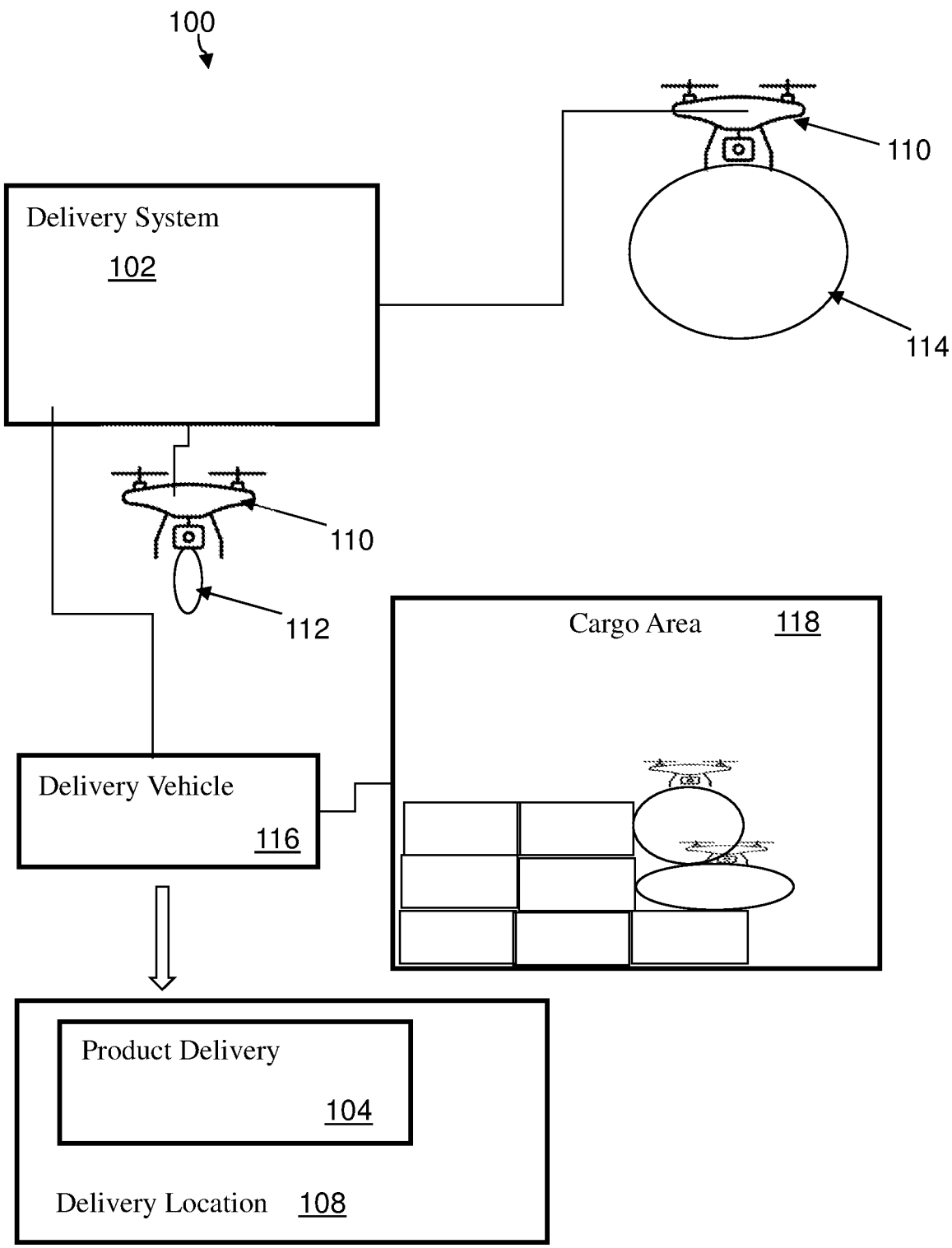
FIG. 1 is a schematic block diagram illustrating a system according to an embodiment of the present disclosure, for generating dynamic supply chain delivery options using computer simulations.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

It is understood that a customer can be an individual, or a group of individuals, or a company or an organization.

Referring to FIG. 1, according to an embodiment of the present disclosure, a system 100 for managing a package delivery system 102 deploys an mobile vehicle which may be an unmanned vehicle where the mobile vehicle includes an inflatable unit, for example, an inflatable bladder for reducing package vibration in a transportation vehicle 116 cargo area 118. The system 102 includes a mobile vehicle, for example a drone 110 having an inflatable bladder 112. The drone 110 can inflate the bladder into an inflated mode 114.

In one example, the delivery system 102 can receive a notification from the delivery vehicle that empty spaces have been created in the cargo areas from packages being delivered. Notifications from the delivery vehicle 116 can also be sent indicating that vibration of the packages in occurring because of empty spaces in the cargo area. The system 102 can send one or more drones 110 to the location of the delivery vehicle. The drone can enter the cargo area 118 of the delivery vehicle 116 and inflate the bladder to occupy space created by the removal of packages inside the cargo area. The cargo area 118 shown in FIG. 1 depicts drones with inflated bladders occupying spaces without packages.

Figure 2:
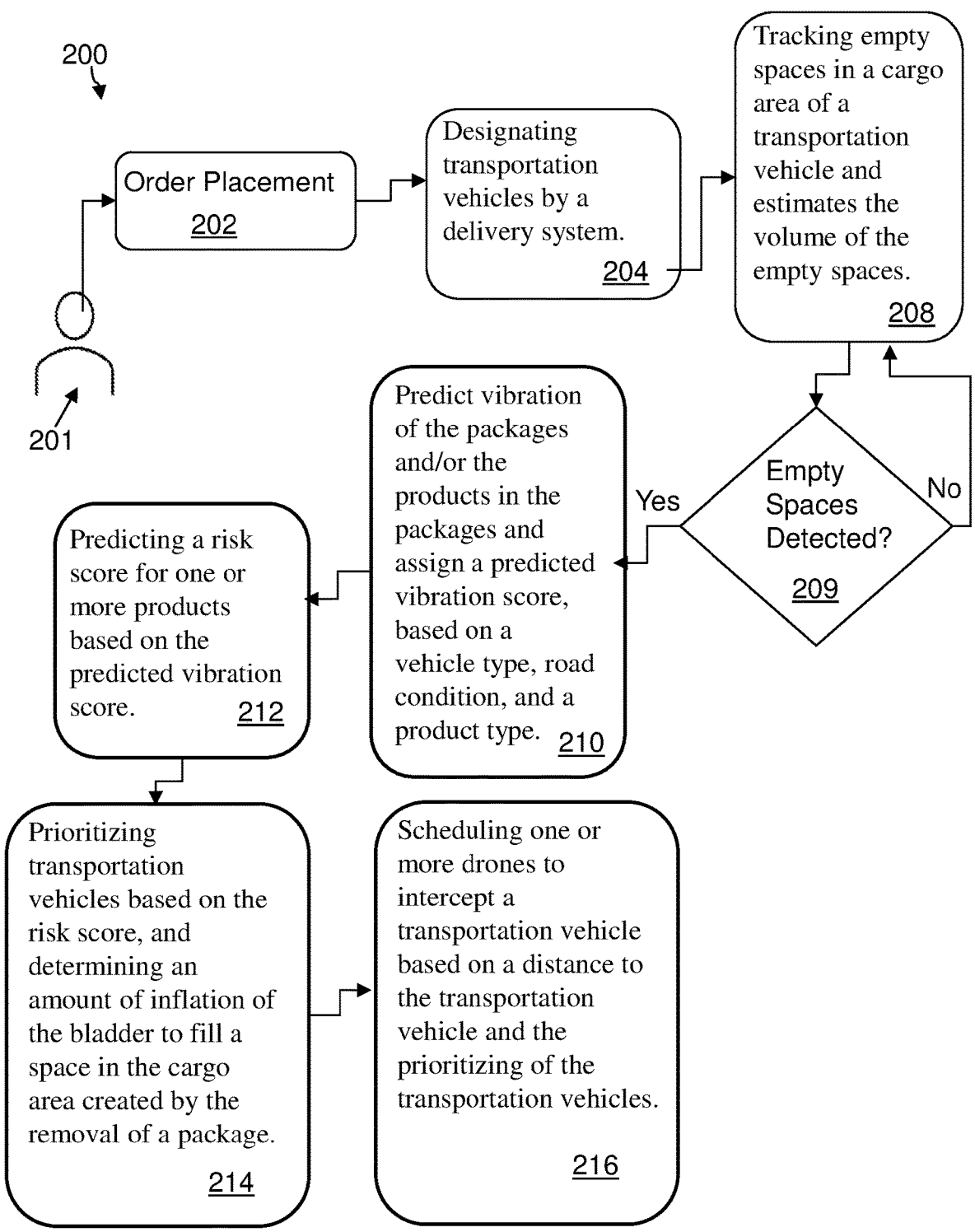
FIG. 2 is a flow chart of a method, according to an embodiment of the present disclosure, which can use the system depicted in FIG. 1, for generating dynamic supply chain delivery options using computer simulations.

In one example, referring to FIG. 2, a method 200, in coordination with the system 100, includes designating transportation vehicles by a delivery system 102, as in block 204. The method can include a user 201 placing an order 202 for a product using an ordering system which can include or communicating with the delivery system. The delivery system tracks empty spaces in a cargo area of a transportation vehicle and estimates the volume of the empty spaces, as in block 208.

The method can determine when empty space are detected at block 209. When no empty spaces are detected the method return to block 208. When empty spaces are detected, the method proceeds to block 210.

The delivery system can predict vibration of the packages and/or the products in the packages and assign a predicted vibration score, based on a vehicle type, road condition, and a product type, as in block 210. The system can predict a risk score for one or more products based on the predicted vibration score, as in block 212. The method 200, using the system 102, includes prioritizing transportation vehicles based on the risk score, and determining an amount of inflation of the bladder 112 to fill a space in the cargo area created by the removal of a package, as in block 214. In another example, the amount of inflation of the bladder can also be determined using dimensions of the removed package(s), the predicted vibration score, and the risk score. The method includes scheduling one or more drones to intercept a transportation vehicle based on a distance to the transportation vehicle and the prioritizing of the transportation vehicles, as in block 216.

According to embodiments of the present disclosure, a method and system can detect removal of packages from a delivery vehicle which can create shaking/vibration because of space created between the packages. Based on the creation of the spaces between the packages because of delivery of packages during transportation, the delivery vehicle can request a remote delivery system to fill the created space so that vibration among the packages can be restricted. Accordingly, one or more drones coupled with inflatable balloons or bladders can occupy the created spaces and be inflated to fill the created open spaces so that the vibration can be prevented or discouraged.

In one example, the embodiments of the present disclosure can apply to cargo containers as well as a transport vehicle such as a cargo truck.

Thereby, embodiments of the present disclosure can include drones automatically scheduling balloon inflation and deflation tasks during transportation to avoid vibration of products in a cargo area created due to the empty spaces in a vehicles. The method and system can include estimating product removals, road condition, attributes of products (e.g., fragility, size, etc.), and a risk-score associated with a product.

Embodiments according to the present disclosure can include estimating space between packages that can be filled. The estimated space can be determined by route and logistics. Based on a delivery sequence of various packages along with a transportation route, a delivery device can estimate how much open spaces will be created inside the delivery vehicle along with the transportation route, and accordingly one or more balloons inside the delivery device can occupy the created spaces so that the vibration can be reduced or prevented. For example, estimating the space between packages in a vehicle can include a delivery vehicle computer estimating the volume of empty spaces, identifying road conditions, etc., and accordingly predicting if and when empty spaces among the packages can cause vibration. Further, accordingly, pressure of one or more balloons can be adjusted so that vibration can be discouraged and/or prevented.

In one example, a device can be deployed to fill an empty space between boxes or packages in a cargo area. Based on an amount of created open space inside the delivery vehicle, one or more drones having balloons attached can enter inside the delivery vehicle and be inflated so that the open space created can be occupied and vibration can be reduced or prevented among the packages. During transportation, if the delivery vehicle needs to receive returned products or the vehicle is to be loaded from any intermediate warehouse, then one or more drones can deflate the balloons to create the required spaces, and the drones can leave the delivery vehicles. In one example, methods and systems can predict vibration and package movement simulation. In another example, if the delivery system predicts poor road conditions resulting in vibration on the packages inside the delivery vehicle, the system can identify road sections where the packages can be vibrating, and accordingly, a drone-based system can inflate balloons inside the delivery vehicles so that the vibration can be reduced or prevented.

In another example, methods and systems according to the present disclosure can detect/sense sharp objects as balloons are inflated/deflated to ensure that balloons are not damaged. Boundaries of sharp object can be detected and accounted for and diminished by addition of resistant inflatable material. In one example, a video feed of a vehicle's storage compartment(s) can provide monitoring and input for mitigating the possible effects of a sharp objects.

In one example, according to embodiments of the present disclosure, mechanisms the mechanism can also be employed by the delivery vehicle/cargo container itself using a device that is present in the transport vehicle. For example, video feeds can provide real-time dynamic feedback to potential package shifting movement based on delivery and next movement prediction paths.

In another embodiment according to the present disclosure, the following operation includes, based on the delivery sequence of various packages along with the transportation route, a delivery system with a delivery device or vehicle estimating how much open spaces will be created, i.e., predicting open spaces, inside the delivery vehicle along with the transportation route. Accordingly, the system can deploy one or more balloons inside the delivery device to occupy the created spaces so vibration can be prevented or reduced. In one example, a camera or ultrasound can be used to detect open spaces due to the removal of products. Object recognition techniques can be trained to detect open spaces with measurements, or ultrasound reflections can also be used to capture these metrics. Based on the detected volume of space, airflow to inflate the balloon can be determined.

Continuing, the delivery system can estimate the volume of empty spaces, identifying road conditions, etc., and accordingly predict if the empty spaces among the packages can cause any vibration. In response, one or more balloons are adjusted so that the vibration can be prevented or reduced. Road conditions can be determined by tracking location, road features from spatial temporal data sources. Based on this data, the condition of the road can be inferred which is used to predict a vibration index of products during travel. This can be modeled as a regression problem, where based on the condition of the road and the product attributes and product or package layout, vibration intensities are predicted.

Further, based on an amount of created open space inside the delivery vehicle, one or more drones having balloons attached can enter inside delivery vehicles and can inflate balloons so that the open space created can be occupied and vibration can be prevented among the packages. Drones can determine a trajectory path based on the balloon inflation needs of the nearby vehicles. The system can further prioritize vehicles based on the distance to reach a delivery vehicle, number of balloons to inflate, and predicted vibration prediction score.

In another example, one or more drones can deflate the balloons to create a required space and leave the delivery vehicle if the delivery vehicle must accept returned products or the delivery vehicle should pick up an additional load from an intermediate warehouse during the transportation.

In another example, if the delivery system predicts poor road conditions will create vibration on the packages inside the delivery vehicle, the system can identify road sections where the packages can vibrate. Accordingly, a drone-based system can inflate balloons inside the delivery vehicles so that the vibration can be prevented or reduced.

The embodiments according to the present disclosure can include methods and systems which can prevent damage from a container shaking due to road conditions, as a result of expanding an inflatable tube or bladder when one or more of packages are removed. Examples can include estimating empty space based on a delivery sequence, a type of product (e.g., fragile, or a fragility ranking), road curvature and road conditions on a delivery path to calculate a risk score. The risk score can be used to request a specific number of vehicle, such as drones or swarm of drones with balloons that can be used to fill the space and prevent vibration and movement of packages. The drones can be permitted into a cargo space of a vehicle based on authorization. An inflatable mechanism can occupy one or more empty spaces based on a need, such as stabilizing packages with spaces in between them, and dynamically inflate inflatables, as more boxes/packages are delivered, and dynamically deflate inflatables if returned items are added to the delivery vehicle. A system can sense sharp object using video feeds received from the vehicle compartment and prevent damage to the balloons using a resistant material. A system can learn, and can automatically schedule drone-based balloons based on a load distribution and inflation/deflation of balloons in a vehicle to prevent damage to the products by preventing vibration on specific segments of the route. The drones can be released out of the vehicle when not needed.

In one example according to the present disclosure a system or method for inflating an inflatable bladder or balloon for filling a transportation space can be used to transport packages. The inflatable bladder can prevent or discourage vibration or physical interaction between the packages or transport vehicle for preventing damage to the packages. More specifically, a system or method can include receiving packaging data, at a computer, including a number and size of packages, a transport space in a transport vehicle, and a transportation route; tracking and predicting open spaces in the transport space based on package deliveries and the packaging data. Based on a prediction of open spaces in the transport space, delivering by one or more drones inflatable balloons in the transport space can be in proportion to the open spaces for discouraging package movement with can result in package damage resulting in product damage within a package. The system and method includes inflating the balloons using the one or more drones; and using the one or more drones for deflating the balloons in response to transport space adjustments as a result of receiving packages in the transport space.

Other Embodiments and Examples

Figure 3:
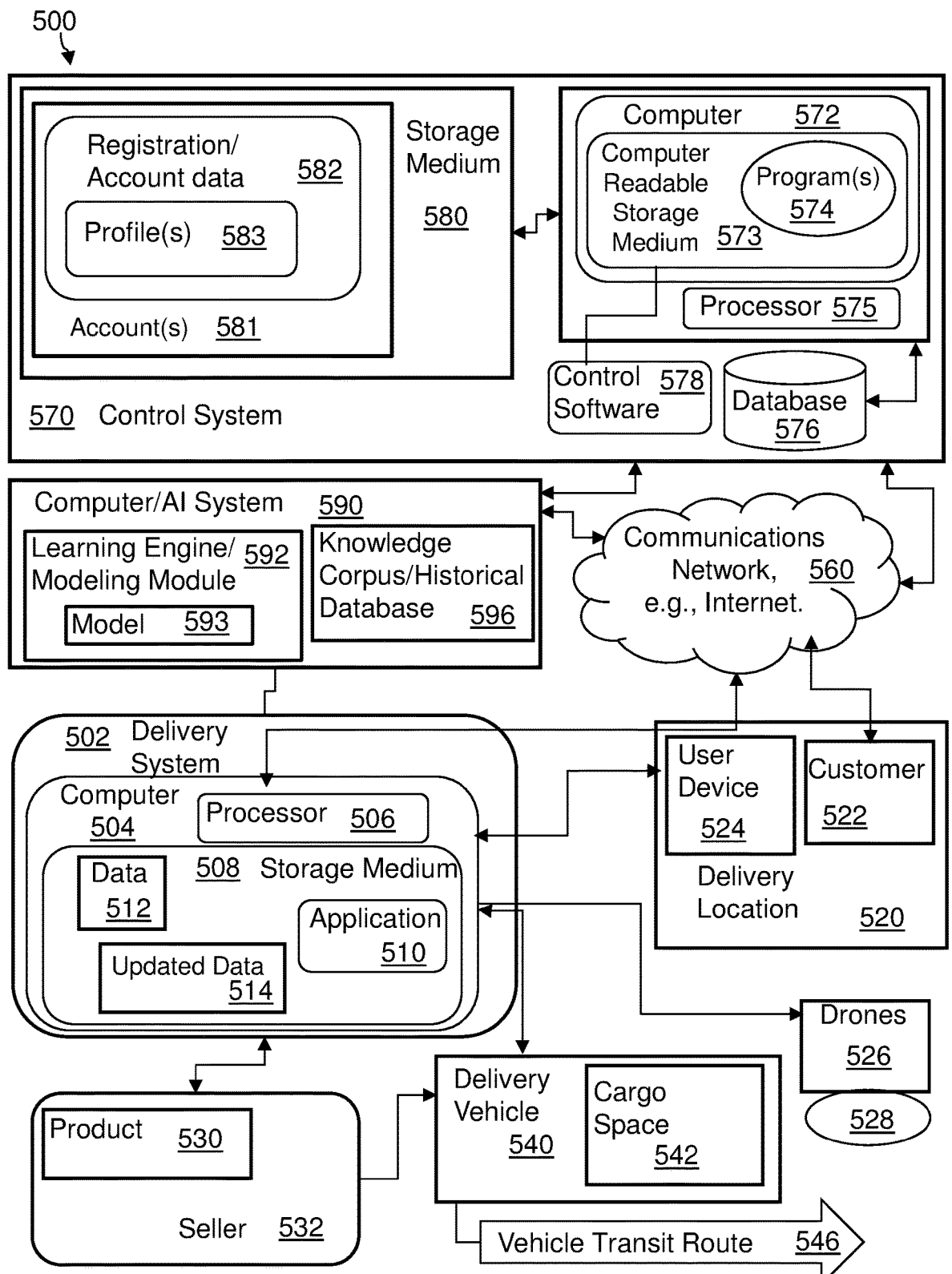
FIG. 3 is a schematic block diagram of a system, according to another embodiment of the present disclosure, for generating dynamic supply chain delivery options using computer simulations.
Figure 4:
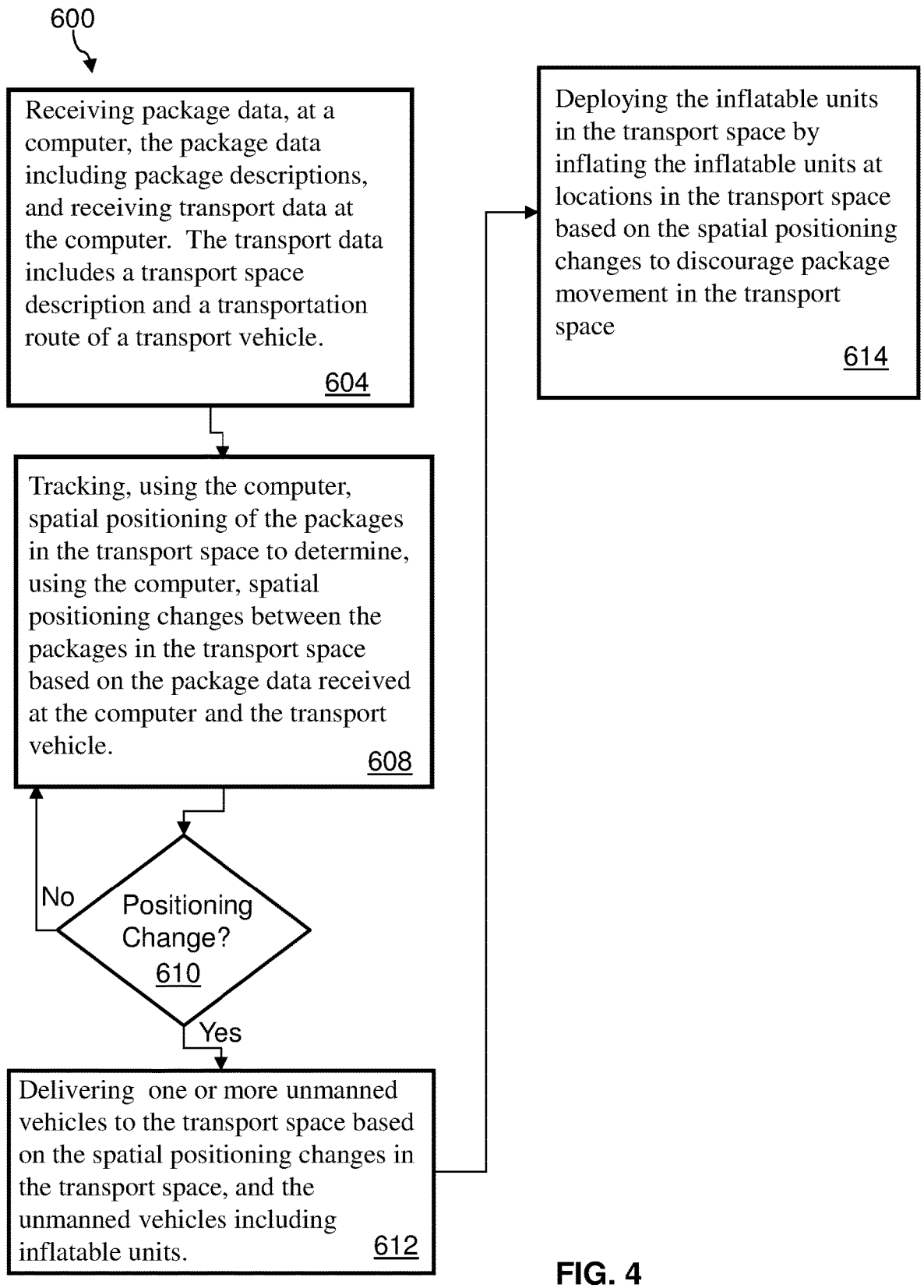
FIG. 4 is a flow chart illustrating a method according to an embodiment of the present invention which can use the system depicted in FIG. 3, for generating dynamic supply chain delivery options using computer simulations.

Referring to FIG. 4, in an embodiment according to the present disclosure, a computer-implemented method 600, using a system 500 shown in FIG. 3, can manage a package delivery system 502 deploying an unmanned vehicle, for example a drone 526, wherein the drone includes an inflatable unit such as an inflatable bladder or balloon 528 for reducing package vibration in a transportation vehicle or delivery vehicle 540.

In one example, the delivery system 502 can include a computer 504 including a processor 506 and a computer readable storage medium 508 where an application 510 can be stored which can in one example, embody all or part of the method of the present disclosure. The application can include all or part of instructions to implement the method of the present disclosure, embodied in code and stored on a computer readable storage medium. The computer and/or device can include a display. The computer 504 can operate, in all or in part, in conjunction with a remote server by way of a communications network 560, for example, the Internet. The delivery system can include received data 512 and receive updated data 514, as well as have access to a historical database or knowledge corpus 596.

The method 600 includes receiving data 512 which can include package data, at a computer 504, the package data including package descriptions, as in block 604. The method can further receive transport data as part of data 512 at the computer 504. The transport data can include a transport space description, e.g., a cargo space 542 description and a transportation route 546 of a transport vehicle 540, as also described in block 604.

The method includes tracking, using the computer, spatial positioning of the packages in the transport or cargo space 542 to determine, using the computer, spatial positioning changes between the packages in the transport space based on the package data received at the computer and the transport or delivery vehicle 540, as in block 608. The method can include using the computer, open spaces in the transport space based on the spatial positioning of packages and spatial changes of packages in a cargo area, which can include creation of open spaces between packages.

The method includes receiving or detecting positioning changes at block 610. When a positioning change is not received or detected, the method returns to block 608. When a positioning change is received or detected at block 610, the method continues to block 612.

The method includes delivering one or more unmanned vehicles, such as drones 526 to the transport space or cargo space 542 based on the spatial positioning changes in the transport space. The unmanned vehicles such as drones 526 include inflatable units 528, respectively.

The method includes deploying the inflatable units in the transport space by inflating the inflatable units 528 at locations in the transport space based on the spatial positioning changes to discourage package movement in the transport space, as in block 614. Package movement in a cargo area can result in package damage resulting in product damage within a package.

The method can further include predicting open spaces in the transport space based on the spatial positioning and the spatial positioning changes between the packages. Based on the predicting of open spaces in the transport space, the method can deliver one or more unmanned vehicles to a cargo space, and initiate deploying inflatable units including the inflating of the inflatable units at the locations corresponding to the predicted open spaces.

As previously described, the unmanned vehicles can include drones or other unmanned arial vehicles. The unmanned vehicles can include drones and the method can further include positioning the inflatable units, using the drones, respectively, between the packages based on the tracking data and the spatial positioning changes. Thereby, the locations in the transport space can correspond to the predicted space. The inflatable units of the drones can include inflatable balloons for deployment in the transport space. Such deployment of the inflatable balloons in the transport space can be proportion to the open spaces for discouraging package movement with can result in package damage resulting in product damage within a package.

In one example, the deployment of the inflatable units occurs during the transportation route of the transport vehicle. The deployment of the inflatable units can occur while the transportation vehicle in in route to delivery destinations during the transportation route. The data can include, for example, information including an amount of packages, dimensions of the packages, and dimensions of a transport space in a transport vehicle, and a transportation route.

In one example, the method can further include deflating inflated units of the inflatable units balloons in response to transport space adjustments as a result of receiving packages in the transport space. Such deflation can be initiated on location using the drones, and can be managed or controlled remotely using a control system or remote system, managing the drones and communicating with a delivery system.

Figure 5:
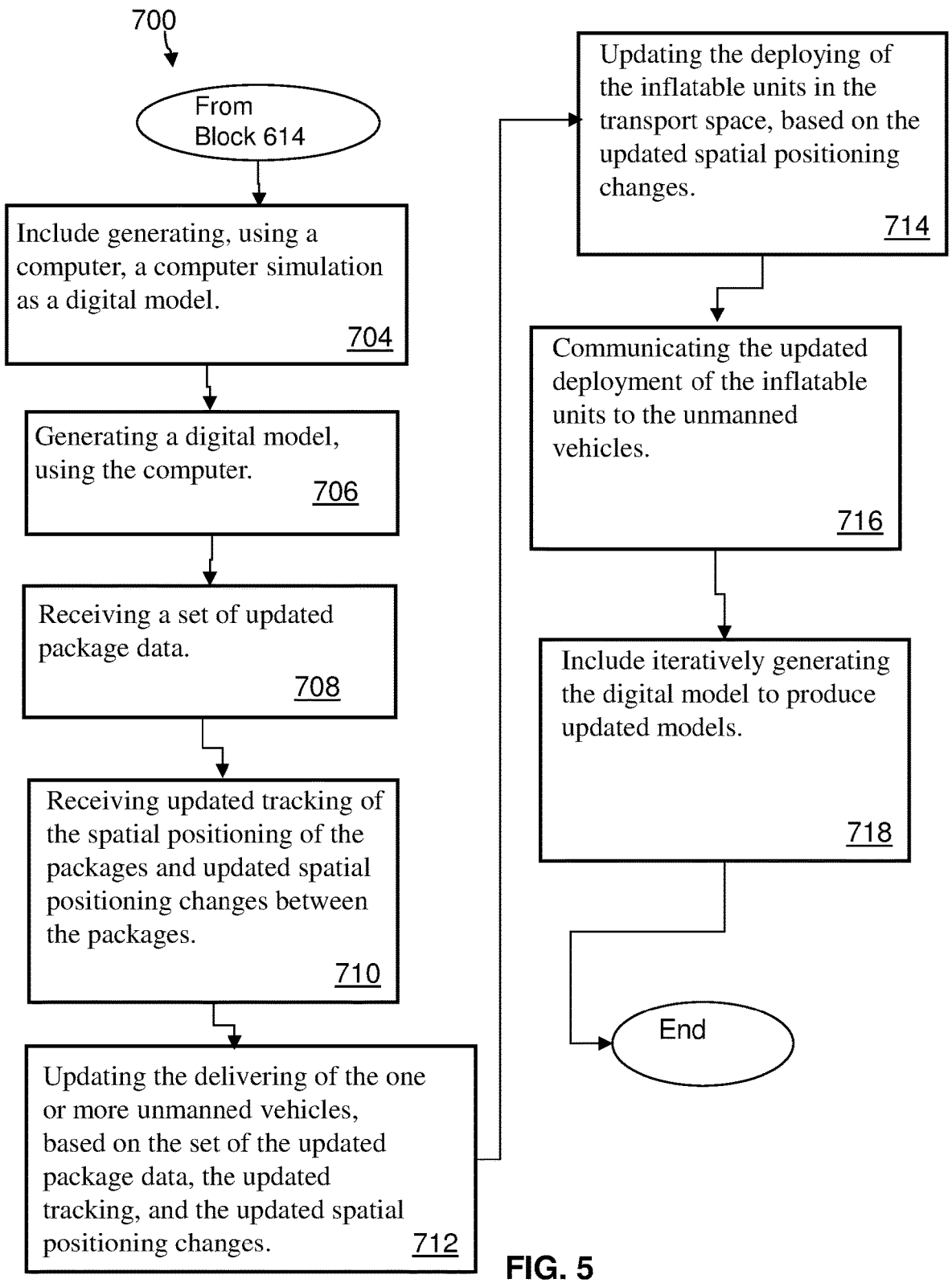
FIG. 5 is a flow chart illustrating another method according to an embodiment of the present invention, continuing from the method shown in FIG. 4.

Referring to FIG. 5, in one embodiment, a method 700 can continue from block 614 of the method 600 shown in FIG. 5 can include generating, using a computer, a computer simulation as a digital model, as in block 704. The method can include generating a digital model, using the computer, as in block 706. The digital model can include the following, wherein the method includes receiving a set of updated package data. The updated package data includes updated package description and updated transport data, as in block 708. The method includes receiving updated tracking of the spatial positioning of the packages and updated spatial positioning changes between the packages, as in block 710. The method includes updating the delivering of the one or more unmanned vehicles, based on the set of the updated package data, the updated tracking, and the updated spatial positioning changes, as in block 712. The method includes updating the deploying of the inflatable units in the transport space, based on the updated spatial positioning changes, as in block 714. The method further includes communicating the updated deployment of the inflatable units to the unmanned vehicles, as in block 716. The method can further include iteratively generating the digital model to produce updated models, as in block 718.

Additional Examples and Embodiments

Referring to the figures, and for example FIG. 3, a system 500 includes a computer 504 which can be integral to or communicating with a device, and communicate with other computers such as computer 590 or computer 572 of a control system 570. A computer 590 remote from the delivery system 502 can electronically communicate, in all or in part, with a control system computer 572 as part of a control system 570. The control system can include the computer 572 having a computer readable storage medium 573 which can store one or more programs 574, and a processor 575 for executing program instructions, and can also include control software 538 for managing the one or more programs. The control system 570 can include control software 578. The control system can also include a storage medium which can include registration and/or account data 582 and profiles 583 of users or entities (such entities can include robotic entities) as part of user accounts 581. User accounts 581 can be stored on a storage medium 580 which is part of the control system 570. The user accounts 581 can include registrations and account data 582 and user profiles 583. The control system can also include the computer 572 having a computer readable storage medium 573 which can store programs or code embedded on the storage medium. The program code can be executed by a processor 575. The computer 572 can communicate with a database 576. The control system 570 can also include a database 576 for storing all or part of such data as described above, and other data.

The control system can also communicate with a computer system 590 which can include a learning engine/module 592 and a knowledge corpus or database 596. The computer system 590 can also communicate with the computer 504 of the delivery system 502 and can be remote from the user device 524. In another example, the computer system 590 can be all or part of the control system, or all or part of the device 524. The depiction of the computer system 590 as well as the other components of the system 500 are shown as one example according to the present disclosure. One or more computer systems can communicate with a communications network 560, e.g., the Internet. For example, the computer 590, and the control system 570 can communicate with the communications network 560, and the device 524 which can include a computer can communicate with a local communications network which can communicate with the communications network 560.

In one example, a new or different AI (Artificial Intelligence) ecosystem, or technology/communication or IT (Information Technology) ecosystem can include a local communications network which can communicate with the communications network 560. The system 500 can include a learning engine/module 592, which can be at least part of the control system or communicating with the control system, for generating a model 593 or learning model. In one example, the learning model can model workflow in a new AI or IoT (Internet of Things) ecosystem for machine/devices in the new ecosystem.

In another example, a computer can be part of a device 524. The computer can include a processor and a computer readable storage medium where an application can be stored which can in one example, embody all or part of the method of the present disclosure. The application can include all or part of instructions to implement the method of the present disclosure, embodied in code and stored on a computer readable storage medium. The device 524 can include a display. The device can operate, in all or in part, in conjunction with a remote server by way of a communications network 560, for example, the Internet.

The method can include an analysis generating a model 593 based on received data. A model can also be generated by an AI system, at least in part. In one example, an AI system can generate a model using an AI system analysis using machine learning.

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

Thus, in one example, a control system can be in communication with a computer or device, and the computer can include an application or software. The computer, or a computer in a mobile device can communicate with the control system using the communications network. In another example, the control system can have a front-end computer belonging to one or more users, and a back-end computer embodied as the control system.

Methods and systems according to embodiments of the present disclosure, can be incorporated in one or more computer programs or an application stored on an electronic storage medium, and executable by the processor, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one or more embodiments herein and described in more detail in regards thereto referring to one or more computers and systems described herein.

Also, referring to the figures, a device can include a computer, computer readable storage medium, and operating systems, and/or programs, and/or a software application, which can include program instructions executable using a processor. Embodiments of these features are shown herein in the figures. The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

A control system can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, a computer or device on location, and can access data and additional programs at a back end of the application, e.g., control system.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, which may be shown, for example, in the example figures, for instance an application stored on a computer readable storage medium of a computer or device. The application is stored on the device or computer and can access data and additional programs at the back end of the application, for example, in the program(s) stored in the control system.

The program(s) can include, all or in part, a series of executable steps for implementing the method of the present disclosure. A program, incorporating the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that embodiments shown in the figures depicts one or more profiles, however, the method can include multiple profiles, users, registrations, etc. It is envisioned that a plurality of users or a group of users can register and provide profiles using the control system for use according to the method and system of the present disclosure.

In one example, received data can include data in a knowledge corpus and historical database, which can be populated by historical data gathered, for example, from sensors, robotic device, or other machines or devices.

Referring to one or more embodiments in the figures, a computer or a device, also can be referred to as a user device or an administrator's device, includes a computer having a processor and a storage medium where an application can be stored. The application can embody the features of the method of the present disclosure as instructions. The user can connect to a learning engine using the device. The device which includes the computer and a display or monitor. The application can embody the method of the present disclosure and can be stored on the computer readable storage medium. The device can further include the processor for executing the application/software. The device can communicate with a communications network, e.g., the Internet.

It is understood that the user device is representative of similar devices which can be for other users, as representative of such devices, which can include, mobile devices, smart devices, laptop computers etc.

In one example, the system of the present disclosure can include a control system 570 communicating with a user device via a communications network 560. The control system can incorporate all or part of an application or software for implementing the method of the present disclosure. The control system can include a computer readable storage medium 580 where account data and/or registration data 582 can be stored. User profiles 583 can be part of the account data and stored on the storage medium 580. The control system can include a computer 572 having computer readable storage medium 573 and software programs 574 stored therein. A processor 575 can be used to execute or implement the instructions of the software program. The control system can also include a database 576.

In another example and embodiment, profiles can be saved for entities such as users, participants, operators, human operators, or robotic devices. Such profiles can supply data regarding the user and history of deliveries for analysis. In one example, a user can register or create an account using the control system which can include one or more profiles as part of registration and/or account data. The registration can include profiles for each user having personalized data. For example, users can register using a website via their computer and GUI (Graphical User Interface) interface. The registration or account data can include profiles for an account for each user. Such accounts can be stored on the control system, which can also use the database for data storage. A user and a related account can refer to, for example, a person, or an entity, or a corporate entity, or a corporate department, or another machine such as an entity for automation such as a system using, in all or in part, artificial intelligence.

Additionally, methods and systems according to embodiments of the present disclosure can be discussed in relation to a functional system(s) depicted by functional block diagrams. The methods and systems can include components and operations for embodiments according to the present disclosure, and is used herein for reference when describing the operational steps of the methods and systems of the present disclosure. Additionally, the functional system, according to an embodiment of the present disclosure, depicts functional operations indicative of the embodiments discussed herein.

More Examples and Embodiments

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or ecosystems or environments, which can include, for example and artificial intelligence (AI) environment.

Still Further Embodiments and Examples

A computer implemented method as disclosed herein can include modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. When the model is not acceptable, the method can return to return to a previous operation or proceed as directed, for example as represented by an operational block in a flowchart.

In one example according to the present disclosure, a method can generate a model, using a computer, which can include a series of operations. The model can be generated using a learning engine or modeling module of a computer system which can be all or in part of an Artificial Intelligence (AI) system which communicates with a computer and/or a control system. Such a computer system can include or communicate with a knowledge corpus or historical database.

The model can be generated using a learning engine or modeling module of a computer system which can be all or in part of an Artificial Intelligence (AI) system which communicates with a computer and/or a control system. Such a computer system can include or communicate with a knowledge corpus or historical database. A model can also be generated by an AI system such as an output at least in part of an AI system analysis using machine learning.

Additional Embodiments and Examples

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items.

In one example a user can register have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources. In another example, a control system can be all or part of an Artificial Intelligence (AI) system. For example, the control system can be one or more components of an AI system.

It is also understood that methods and systems according to embodiments of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

More Additional Examples and Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
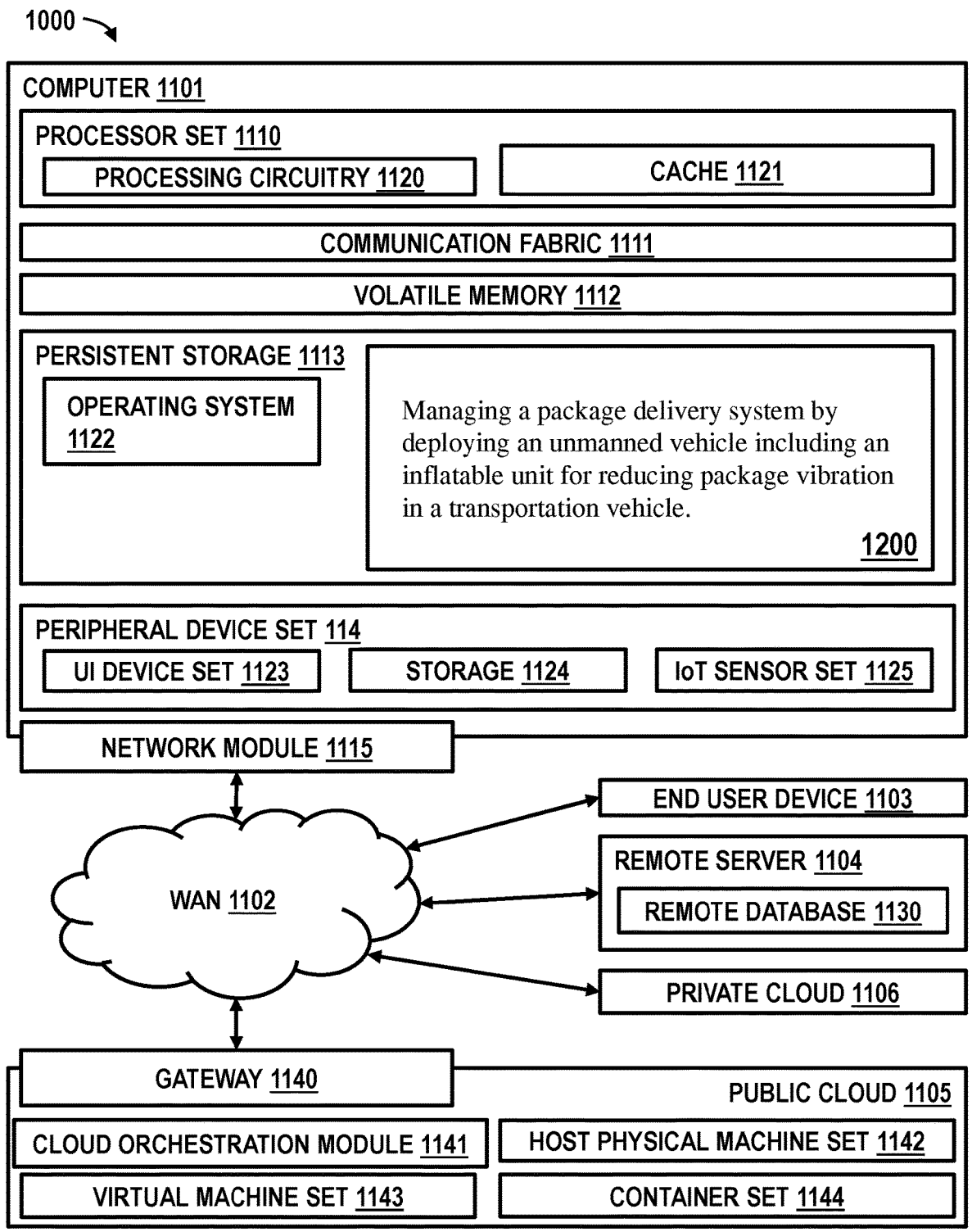
FIG. 6 is a schematic block diagram depicting a computer system according to an embodiment of the disclosure, which includes cloud computing components and functions, and which can cooperate with the systems and methods shown in the figures and described herein.

Referring to FIG. 6, a computing environment 1000 contains an example of an environment for the execution of at least some of the computer code involved in performing the inventive methods, such as managing a package delivery system by deploying an unmanned vehicle including an inflatable unit for reducing package vibration in a transportation vehicle 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

What is claimed is:

1. A computer implemented method for managing a package delivery system deploying an unmanned vehicle including an inflatable unit for reducing package vibration, comprising:
    receiving package data, at a computer, the package data including package descriptions, and receiving transport data at the computer, the transport data including a transport space description and a transportation route of a transport vehicle;
    tracking, using the computer, spatial positioning of the packages in the transport space to determine, using the computer, spatial positioning changes between the packages in the transport space based on the package data received at the computer and the transport data received at the computer;
    delivering one or more unmanned vehicles to the transport space based on the spatial positioning changes in the transport space, and the unmanned vehicles including inflatable units; and
    deploying the inflatable units in the transport space by the unmanned vehicles inflating the inflatable units, respectively, at locations in the transport space based on the spatial positioning changes to prevent package movement in the transport space.

2. The method of claim 1, further including:
    predicting open spaces in the transport space based on the spatial positioning and the spatial positioning changes between the packages; and
    based on the predicting of open spaces in the transport space, delivering the one more unmanned vehicles and initiating the deploying of the inflatable units including the inflating of the inflatable units at the locations corresponding to the predicted open spaces.

3. The method of claim 1, wherein the unmanned vehicles are drones.

4. The method of claim 1, wherein the unmanned vehicles are drones, and the method further comprising:
    positioning the inflatable units, using the drones, respectively, between the packages based on the tracking data and the spatial positioning changes, and the locations in the transport space corresponding to predicted open space.

5. The method of claim 4, wherein the inflatable units of the drones include inflatable balloons for the deployment in the transport space.

6. The method of claim 1, wherein the deployment of the inflatable units occurs during the transportation route of the transport vehicle.

7. The method of claim 1, wherein the deployment of the inflatable units occurs while the transport vehicle is in route to delivery destinations during the transportation route.

8. The method of claim 1, wherein the receiving of the package data and the receiving of the transport data includes an amount of packages, dimensions of the packages, and dimensions of a transport space in a transport vehicle, and a transportation route.

9. The method of claim 1, further comprising:
deflating inflated units of the inflatable units in response to transport space adjustments as a result of receiving packages in the transport space.

10. The method of claim 1, further comprising:
receiving a set of updated package data, wherein the updated package data includes updated package description and updated transport data;
receiving updated tracking of the spatial positioning of the packages and updated spatial positioning changes between the packages;
updating the delivering of the one or more unmanned vehicles, based on the set of the updated package data, the updated tracking, and the updated spatial positioning changes;
updating the deploying of the inflatable units in the transport space, based on the updated spatial positioning changes; and
communicating the updated deployment of the inflatable units to the unmanned vehicles.

11. A system for managing a package delivery system deploying an unmanned vehicle including an inflatable unit for reducing package vibration, which comprises:
a computer system comprising: a computer processor, a computer-readable storage medium, and program instructions stored on the computer-readable storage medium being executable by the computer processor, to cause the computer system to perform functions comprising:
receiving package data, at a computer, the package data including package descriptions, and receiving transport data at the computer, the transport data including a transport space description and a transportation route of a transport vehicle;
tracking, using the computer, spatial positioning of the packages in the transport space to determine, using the computer, spatial positioning changes between the packages in the transport space based on the package data received at the computer and the transport data received at the computer;
delivering one or more unmanned vehicles to the transport space based on the spatial positioning changes in the transport space, and the unmanned vehicles including inflatable units; and
deploying the inflatable units in the transport space by the unmanned vehicles inflating the inflatable units, respectively, at locations in the transport space based on the spatial positioning changes to prevent package movement in the transport space.

12. The system of claim 11, further comprises:
predicting open spaces in the transport space based on the spatial positioning and the spatial positioning changes between the packages; and
based on the predicting of open spaces in the transport space, delivering the one more unmanned vehicles and initiating the deploying of the inflatable units including the inflating of the inflatable units at the locations corresponding to the predicted open spaces.

13. The system of claim 11, wherein the unmanned vehicles are drones.

14. The system of claim 11, wherein the unmanned vehicles are drones, and the system further includes program instruction to cause the computer system to:
position the inflatable units, using the drones, respectively, between the packages based on the tracking data and the spatial positioning changes, and the locations in the transport space corresponding to predicted open space.

15. The system of claim 14, wherein the inflatable units of the drones include inflatable balloons for the deployment in the transport space.

16. The system of claim 11, wherein the deployment of the inflatable units occurs during the transportation route of the transport vehicle.

17. The system of claim 11, wherein the deployment of the inflatable units occurs while the transport vehicle is in route to delivery destinations during the transportation route.

18. A computer program product for managing a package delivery system deploying an unmanned vehicle including an inflatable unit for reducing package vibration, the computer program product comprising a computer readable storage medium having program instructions embodied therewith, the program instructions executable by a computer to cause the computer to perform functions, by the computer, comprising the functions to:
receiving package data, at a computer, the package data including package descriptions, and receiving transport data at the computer, the transport data including a transport space description and a transportation route of a transport vehicle;
tracking, using the computer, spatial positioning of the packages in the transport space to determine, using the computer, spatial positioning changes between the packages in the transport space based on the package data received at the computer and the transport data received at the computer;
delivering one or more unmanned vehicles to the transport space based on the spatial positioning changes in the transport space, and the unmanned vehicles including inflatable units; and
deploying the inflatable units in the transport space by the unmanned vehicles inflating the inflatable units, respectively, at locations in the transport space based on the spatial positioning changes to prevent package movement in the transport space.

* * * * *